3,391,222
METHYLMETHACRYLATE-STYRENE COPOLYMER-IN-MONOMERS SYSTEMS
Paul Robitschek, Wilson, N.Y., assignor to Owens-Corning Fiberglas Corporation, a corporation of Delaware
No Drawing. Filed July 5, 1963, Ser. No. 293,162
4 Claims. (Cl. 260—862)

The present invention concerns fibrous glass reinforced plastics structures having unusual properties, and methods for the preparation of such structures, and particularly concerns structures and methods of the specified nature which involve a fibrous glass reinforced copolymer of styrene and methylmethacrylate in combination with an unsaturated polyester crosslinking agent.

In conjunction with a relatively recent and widespread acceptance and utilization of reinforced plastics structures, a particular form of this type of structure has gained pronounced popularity and extensive usage. The structure referred to may be described as a flat or corrugated panel having two major, parallel surfaces and is widely utilized in both decorative and functional or utilitarian applications. In such use, the panels are frequently employed in glazing or light-transmitting applications or as exterior decorative units which are exposed to the elements. Accordingly, the ultraviolet light stability, light-transmission characteristics, and the weather resistance of the resin system employed in the fabrication of such panels is of great significance.

As a consequence, the utilization of reinforced plastic panels made with conventional styrene-containing unsaturated polyesters has been attended by curtailed acceptance in those applications which entail long term exposure to sunlight and/or the elements. Under such conditions, polyester panels are prone to discolor or assume a yellow hue which is aesthetically detrimental and which diminishes light transmission. In addition, such panels are subject to erosion during long-term outdoor weathering. In an attempt to combat this defect, methylmethacrylate modified unsaturated polyester resins (see Schildknecht "Polymer Processes," Interscience publishers, 1956 edition, pages 768–9) have been employed for such uses. However, such materials have been plagued by some discoloration upon long-term outdoor weathering as well as a tendency toward a loss of bonding between the resin and glass fibers with attendant increased light diffusion and diminished light transmission, in a phenomenon termed "fiber whitening." Another attempt at improved light and weather resistance has involved the use of polymethylmethacrylate systems comprising a solution of the methylmethacrylate polymer in monomeric methylmethacrylate as shown by U.S. Patents 2,289,765, 2,373,446 and 2,899,402. While polymethylmethacrylate panels avoid yellowing they are prone to the fiber whitening phenomenon described in respect to acrylic modified unsaturated polyester panels and are considerably more expensive. In addition, methylmethacrylate polymer-in-monomer solutions or sirups are attended by certain processing problems arising from the relatively high volatility of the methylmethacrylate monomer and the exothermic character of the polymerization reaction. Still further, the conventional methylmethacrylate sirups employ relatively expensive crosslinking agents, e.g. dimethacrylates, which yield product defects when employed in substantial quantities.

As a consequence, the polymethylmethacrylate panels which exhibit good color stability upon exposure to sunlight and weathering are principally utilized in end uses involving these conditions. However, even these improved products are subject to extensive degradation in the form of fiber whitening under the prescribed conditions.

It is an object of the present invention to provide improved synthetic resin panels which are reinforced with fibrous glass.

Another object is the provision of glass fiber reinforced synthetic resin panels having improved resistance to sunlight and outdoor weathering.

A further object is the provision of improved methods for the fabrication of fibrous glass reinforced synthetic resin panels.

An additional object is the provision of a method for the preparation of novel copolymer-in-monomers solutions.

Still another object is the provision of novel copolymer-in-monomers solutions.

The foregoing objects are achieved by means of unusual copolymer-in-monomers solutions which contain an unsaturated polyester crosslinking agent.

Specifically, the described solutions of the invention comprise a copolymer of styrene and methylmethacrylate in an admixture of styrene and methylmethacrylate monomers, and an unsaturated polyester which is also soluble in the admixture of monomers. Such solutions are prepared by means of the copolymerization of styrene and methylmethacrylate in the presence of suitable initiators and chain transfer agents. The degree of copolymerization achieved may be varied in accordance with the properties desired in the ultimate solution, e.g. percentage of solids, viscosity, etc., and an excessive degree of copolymerization may be counteracted by means of the addition of further quantities of the admixture of styrene and methylmethacrylate monomers. While the ratio of styrene:methylmethacrylate employed in the copolymerization should comprise 25–70 parts per hundred by weight of styrene to 30–75 parts per hundred by weight of methylmethacrylate, and similar proportional ranges should be employed in any admixtures of styrene and methylmethacrylate monomers employed as diluents, it should be noted that preferential rates of copolymerization versus homopolymerization may yield a copolymer having a slightly different ratio of the two monomers. Consequently, it may be seen that the compositions of the invention may not be properly defined as a solution of 25–70:30–75 copolymers of styrene:methylmethacrylate, since they are actually the copolymerization product of a 25–70:30–75 feed ratio of the styrene:methylmethacrylate monomers.

The styrene-methylmethacrylate copolymerization may be achieved with conventional free radical initiators such as azoisobutyronitrile, lauroyl peroxide, benzoyl peroxide, and the like, and conventional chain transfer agents such as lauryl mercaptan, n-butyl mercaptan, and the like.

The product of the copolymerization reaction may comprise either a substantially completely copolymerized composition, or a solution of the styrene-methylmethacrylate copolymer in that portion of the styrene and methylmethacrylate monomers which has not entered into the copolymerization reaction. The percentage of solids, and the viscosity of the solution of copolymer-in-monomers may then be adjusted through the addition of further quantities of an admixture of styrene:methylmethacrylate monomers in a ratio of 25–70:30–75. For convenience, it is preferred to carry out the copolymerization to the degree that only a portion of the styrene and methylmethacrylate are copolymerized, while an additional portion of these two materials remains in the form of monomers. For example, in the preparation of copolymer-in-monomers solutions to be employed in the impregnation of fibrous glass mats, it has been found expedient to continue the copolymerization until solutions containing between 30–50% by weight of solids, and having viscosities between 3–6 poises (@ 25° C.), are obtained. To such solutions, an admixture of styrene and methylmethacrylate monomers may be added until a solution having a viscosity of approximately 2 poises (@ 25° C.) is obtained. While the foregoing solutions are highly satisfactory for the prescribed uses, i.e. the impregnation of fibrous glass mats in the fabrication of fibrous glass reinforced panels, it should be noted that a broad spectrum of such solutions may be obtained, either through the control of the degree of copolymerization, or through the addition of admixtures of monomers.

It is apparent that the quantity of the monomeric admixture of styrene and methylmethacrylate which may be added to the copolymer-in-monomers solution, is dependent upon the degree of copolymerization achieved in the synthesis of the copolymer-in-monomers solution, and the viscosity desired in the final copolymer-in-monomers system. In the latter regard, it should be noted that the ultimate viscosity is further affected by the incorporation of additional solids in the form of the polyester crosslinking agent which will be subsequently discussed. Accordingly, it may be seen that the addition of monomeric styrene and methylmethacrylate, and the quantity of such materials to be added, is subject to other process and end product considerations. However, it may be generally stated that any additive of monomeric styrene and methylmethacrylate to the solution of copolymer-in-monomers is preferably calculated to yield an ultimate copolymer-in-monomers system, which contains between 5 to 70% by weight of solids, including those solids which are attributable to the polyester crosslinking agent.

Between 3 to 40% by weight of an unsaturated polyester crosslinking agent is then added to the previously described solutions of copolymer-in-monomers. Such polyesters comprise the reaction product of an ethylenically unsaturated alpha, beta-dicarboxylic acid and a dihydroxy alcohol. The term "ethylenically unsaturated alpha, beta-dicarboxylic acid" as employed herein, is intended to encompass both dicarboxylic acids and the existing anhydrides of these acids. While polyesters prepared from maleic, fumaric and itaconic acids, or maleic and itaconic anhydrides, are preferred, those formed from mesaconic, citraconic and chloro-maleic acids, as well as from the anhydrides of citraconic and chloro-maleic acids, are also suitable. In addition, mixtures of such acids and anhydrides may be employed.

While 1,3-butylene glycol is preferred as the dihydroxy alcohol reactant in the preparation of the prescribed unsaturated polyester, other dihydroxy compounds or mixtures of dihydroxy compounds, such as neopentyl glycol, 1,4-butanediol, hexylene glycol, ethylene glycol, diethylene glycol, propylene glycol, dipropylene glycol, and the like, are also satisfactory.

In addition to the unsaturated acid and dihydroxy alcohol reactants, the unsaturated polyester crosslinking agents may contain quantities of other reactants or ingredients. For example, the unsaturated polyesters may be modified by saturated acids such as phthalic, isophthalic, adipic, succinic, sebacic acid, etc. In addition, triols such as glycerin or monohydroxy alcohols such as butyl alcohol, 2 ethyl hexyl alcohol, tetrahydrofurfuryl alcohol and the like, may be employed in addition to, or in combination with, the dihydroxy alcohol utilized in the preparation of the unsaturated polyester.

Although an unsaturated polyester crosslinking agent comprising the reaction product of maleic anhydride and 1,3-butylene glycol is preferred because of its excellent solubility and processing characteristics, suitable properties have also been obtained with the following molar ratios of reactants: neopentyl glycol:maleic anhydride (1:1.18); 1,3-butylene glycol:fumaric acid (1:1); neopentyl glycol:itaconic acid (1:1).

To prepare a casting, impregnating or laminating system from the previously described combinations of copolymer-in-monomers solutions and unsaturated polyester crosslinking agents, conventional free radical initiators such as benzoyl or lauroyl peroxide are added to the combination and are suitable for the ultimate curing of the compositions of the invention. Accelerators, such as certain metallic salts, quaternary ammonium halides, aryl sulfonium salts, aromatic amines, etc., can be used in combination with peroxide initiators to accelerate the curing reaction, as in known to those skilled in the art. If accelerator-initiator systems are to be employed, they should be selected with a view toward the properties desired in the final laminate. For example, certain of these systems, e.g. dimethyl aniline-benzoyl peroxide, cause the development of color in the laminate and their use should be avoided when color stability is desired.

The synthesis of a preferred unsaturated polyester crosslinking agent, and the preparation of laminating systems containing a solution of copolymer-in-monomers, are set forth by the following examples:

Example 1

230 pounds of 1,3-butylene glycol and 247 pounds of maleic anhydride were placed in a reactor at room temperature, under a 0.25 c.f.m. nitrogen sparge. Heat was applied and at 150° F. agitation was commenced. The temperature was elevated to 330° F. and the materials were reacted to an acid value of 110; distillate glycol losses were maintained below 4%. The reaction product comprised 465 pounds of unsaturated polyester having an acid number of 110. A solution of 80 parts by weight of the polyester and 20 parts by weight of Cellosolve acetate had a Gardner viscosity of W— at 25° C.

Example 2

The following ingredients were placed in a reactor at room temperature:

| Ingredient: | Pounds |
|---|---|
| Methylmethacrylate | 292 |
| Styrene | 158 |
| 2,2 azo-bis-isobutyronitrile | 0.3 |
| Lauryl mercaptan | 1.8 |

Nitrogen was then added through a sparge ring and maintained throughout the reaction at 0.25 c.f.m. The mixture was heated at 230° F. for a period of 90 minutes, cooled to 140° F., filtered, and permitted to cool to room temperature. The resultant solution of copolymer-in-monomers contained 42.3% by weight of solids and exhibited a viscosity of 5.6 poises at 25° C.

An admixture of methylmethacrylate and styrene monomers (65:35 weight ratio) was then added to the solution of copolymer-in-monomers until a viscosity of 2 poises (@25° C.) was achieved. The attainment of the specified viscosity entailed the addition of approximately 17% by weight of the admixture of monomers.

The unsaturated polyester of Example 1 was then added to the diluted solution of copolymer-in-monomers in a quantity equal to 13% by weight of the total composition.

Example 3

The following ingredients were placed in a reactor at room temperature:

| Ingredient: | Pounds |
|---|---|
| Methylmethacrylate | 225 |
| Styrene | 225 |
| 2,2 azo-bis-isobutyronitrile | 0.3 |
| Lauryl mercaptan | 1.8 |

Nitrogen was then added through a sparge ring and maintained throughout the reaction at 0.25 c.f.m. The temperature was increased to 225° F. during a 45 minute period and maintained for an additional period of 1 hour and 45 minutes. The reaction mixture was then cooled to 150° F., filtered, and permitted to cool to room temperature. The resultant solution of copolymer-in-monomers contained 43.6% by weight of solids.

The solution of copolymer-in-monomers was then diluted to a viscosity of 2 poises by means of the addition of an admixture of styrene and methylmethacrylate monomers (50:50 by weight) until a viscosity of 2 poises at 25° C. was achieved. The achievement of that viscosity required the addition of 118 parts by weight of the monomer admixture for each 100 parts by weight of the solution of copolymer-in-monomers, and the original 43.6% by weight of solids was reduced to 20% by weight of solids.

For purposes of simplification, the reaction products of the copolymerization reaction of Examples 2 and 3, as diluted with monomers to the desired viscosity, have been referred to as "copolymer-in-monomers solutions," while the combination of the copolymer-in-monomers solutions and the polyester crosslinking agent is referred to as "copolymer-in-monomers systems."

As a demonstration of the highly satisfactory properties and performance of laminates prepared from the compositions of the invention, fibrous glass reinforced corrugated panels were prepared from the copolymer-in-monomers system of Example 2 with 1.6% by weight of lauroyl peroxide initiator. In the fabrication of the panels, a 1 ounce per square foot chopped fibrous glass strand mat was impregnated with the copolymer-in-monomers system and initiator, and cured between 2.5" x 0.5" corrugated aluminum caul sheets at an oven temperature of 170° F. To provide a standard for comparison, similar panels were prepared from a conventional polymer-in-monomer solution noted for its resistance to sunlight and weathering, and comprising approximately 64% by weight of methylmethacrylate, 34% by weight of polymethylmethacrylate and 2% by weight of triethylene glycol dimethacrylate. It was found that the quantity of the crosslinking agent and the curing conditions employed with the control or polymer-in-monomer system could not be made to conform to those employed with the systems of the invention. Specifically, while the copolymer-in-monomers system of the invention could be cured at 175° F., the conventional polymer-in-monomer solution could not safely be subjected to oven temperatures above 150° F. since the occurrence of unsightly bubbles within the laminates was experienced at temperatures as low as 155° F. In view of the exothermic problems experienced in the curing of methylmethacrylates, it is particularly significant that the systems of the invention exhibited lower peak exotherms than those of the conventional polymer-in-monomer system, i.e. 188° F. versus 220° F. These factors are of great importance in the fabrication of laminates, since the ability of the compositions of the invention to be cured at higher temperatures, and their lower peak exotherms, permit a more rapid processing under less sensitive processing conditions. In addition, it was found that the dimethacrylate crosslinking agents of the conventional methylmethacrylate systems could not be employed in the quantities in which the polyester crosslinking agents are utilized in the copolymer-in-monomers systems of the invention. For example, when 3% or more of the dimethacrylate crosslinking agents were employed in the conventional systems, highly undesirable dull or dry spots appeared on the otherwise glossy surface of the laminates, and the occurrence of such defects increased in a direct proportion to the quantity of crosslinking agent employed. Accordingly, the fabrication of the control panels differed from the preparation of the panels prepared in accordance with the invention, in that lower curing temperatures and a smaller quantity of crosslinking agent were employed.

In a comparison of the properties of the panels prepared in accordance with the invention, and those prepared from the conventional system, it was found that the former exhibited at least equivalent resistance to ultraviolet light. Specifically, after an eight day exposure to an ultra-violet light source, the panels of the invention possessed visual properties at least equivalent to the conventional or control panels. In addition, after a seven day immersion in water (50° C.), the panels of the invention were superior to the conventional panels in that fewer blotches occurred and those which did occur were of a smaller size.

Such results were duplicated in a weathering test, in which the inventive and control panels were exposed to sunlight and the elements in southern Florida for a period of one year. Under such conditions the control panels exhibited pronounced fiber whitening and attendant unsightliness and reduction of light transmission, while the panels prepared in accordance with the invention were not perceptibly affected. It is also interesting to note that similar panels prepared from the copolymer-in-monomers system of Example 3, which has a higher styrene content (50% as opposed to 35% in the case of Example 2) could not be distinguished from the panels prepared from the system of Example 2, and exhibited a similar superiority to the control panels.

In addition, it is significant that superior flexural and QPL (quarter point loading) strengths, and modulus were achieved with the panels of the invention than were realized with the conventional methylmethacrylate system panels, even when a lower glass fiber content was employed, i.e. 24.2% glass fiber versus 30.9%. This contrast is illustrated by the following table:

| Property | Panels Prepared From Copolymer-in-Monomers System of Example 2 | Panels Prepared From Conventional Methylmethacrylate Polymer-in-Monomer System |
| --- | --- | --- |
| Flexural strength (p.s.i.×10³) | 20.7 | 16.6 |
| Modulus (p.s.i.×10⁶) | .811 | .690 |
| QPL (pounds) | 430.2 | 408.5 |

Consequently it is apparent that fiber reinforced laminates of improved weather resistance, improved laminating resins comprising copolymer-in-monomers systems, and improved methods for the preparation of fiber reinforced laminates are provided by the present invention. It should also be noted that improved economics are made possible by both process improvements, and through the utilization of a styrene component and a polyester crosslinking agent in place of the more expensive methylmethacrylate and dimethacrylate components of the prior art compositions.

While the reinforced structures of the present invention have been primarily discussed in respect to utilizations involving fibrous glass reinforcements in general, it should be noted that specific structures may require a specific form of reinforcement. For example, while a continuous strand mat or a chopped strand mat is preferred as the principal reinforcement, in combination with fine strand, light weight, surfacing mats, various forms of chopped fibrous glass strands or continuous strands or rovings may be utilized.

It is further obvious that various changes, substitutions and alterations may be made in the compositions, methods and laminates of the present invention, without departing from the spirit of the invention as defined by the following claims.

I claim:

1. A method for the preparation of a copolymer-in-monomers system comprising partially copolymerizing to a solids content of between 30 to 50 percent by weight an admixture of between 25 to 70 parts by weight of styrene and between 30 to 75 parts by weight of methylmethacrylate to yield a solution of a styrenemethylmethacrylate copolymer in the monomeric uncopolymerized residue of said styrene and said methylmethacrylate, and adding to said solution between 3 to 40% by weight of an unsaturated polyester crosslinking agent prepared by the reaction of an ethylenically unsaturated alpha, beta-dicarboxylic acid and a dihydroxy alcohol.

2. A method as claimed in claim 1 in which an additional quantity of a monomeric admixture of between 25 to 70 parts by weight of styrene and between 30 to 75 parts by weight of methylmethacrylate is added to said solution, said additional quantity of said admixture being an amount sufficient to provide a solution having a viscosity of approximately 2 poises.

3. A method as claimed in claim 1 in which said solution is the copolymerization product of 35 parts by weight of styrene and 65 parts by weight of methylmethacrylate in the monomeric uncopolymerized residue of said styrene and said methylmethacrylate.

4. A method as claimed in claim 1 in which said unsaturated polyester is the reaction product of 1,3-butylene glycol and maleic anhydride.

References Cited
UNITED STATES PATENTS

| | | | |
|---|---|---|---|
| 2,984,643 | 5/1961 | Nischk et al. | 260—862 |
| 3,042,651 | 7/1962 | Martens | 260—872 |
| 3,051,679 | 8/1962 | Forsyth | 156—332 |
| 3,261,886 | 7/1966 | Lowry | 260—872 |

JULIUS FROME, *Primary Examiner.*

MORRIS LIEBMAN, *Examiner.*

L. T. JACOBS, *Assistant Examiner.*